United States Patent [19]

Morimoto et al.

[11] Patent Number: 5,364,643

[45] Date of Patent: Nov. 15, 1994

[54] PROCESS FOR THE INFUSION OF DRIED FRUITS

[75] Inventors: Keisuke Morimoto, Congers; Joaquin C. Lugay, Mahopac, both of N.Y.

[73] Assignee: Kraft General Foods, Inc., Northfield, Ill.

[21] Appl. No.: 127,664

[22] Filed: Sep. 27, 1993

[51] Int. Cl.[5] ............................................. A23B 7/16
[52] U.S. Cl. .................................. 426/102; 426/302; 426/307; 426/310; 426/321; 426/573; 426/575; 426/577; 426/578; 426/615; 426/639; 426/640
[58] Field of Search .............. 426/102, 302, 307, 310, 426/321, 615, 640, 639, 573, 575, 577, 578

[56] References Cited

U.S. PATENT DOCUMENTS

| | | | |
|---|---|---|---|
| 3,952,112 | 4/1976 | Fulger et al. | 426/302 |
| 4,256,772 | 3/1981 | Shanbhag et al. | 426/331 |
| 4,696,824 | 9/1987 | Meczkowski et al. | 426/102 |
| 4,775,545 | 10/1988 | Augustine et al. | 426/639 |
| 4,888,187 | 12/1989 | Given, Jr. et al. | 426/102 |
| 4,917,910 | 4/1990 | Hsieh et al. | 426/102 |
| 5,000,971 | 3/1991 | Hsieh et al. | 426/302 |

Primary Examiner—Helen Pratt
Attorney, Agent, or Firm—Thomas A. Marcoux; Thomas R. Savoie; Linn I. Grim

[57] ABSTRACT

The present invention provides a process for infusing dried fruits by coating the dried fruits with an edible humectant containing gel. This process provides novel infused products using a minimum of energy with a minimum of damage to the infused product while maintaining a maximum of flavor of the dried fruit.

13 Claims, No Drawings

PROCESS FOR THE INFUSION OF DRIED FRUITS

FIELD OF THE INVENTION

This relates to a novel process for humectant infusion of dried fruits and to the products produced thereof. More particular, the present invention is concerned with coating dried fruit with an edible humectant containing gel providing a highly efficient infusion technique with a minimum of energy requirements, with a minimum of damage of the dried fruit and maintaining a maximum of flavor of the dried fruit.

BACKGROUND OF THE INVENTION

The combination of dried fruits and ready-to-eat cereal products, being dry and having relatively low water activities, tends to further desiccate the dry fruit. After a short time untreated dry fruit for example, raisins, bananas, peaches and the like tend to become unacceptably hard or at least become tough when packaged in the presence of dry products such as ready-to-eat cereals. The fruit which has been dehydrated sufficiently to prevent spoilage, is of the magnitude as to make the dried fruit generally unappetizing and unacceptable. To overcome this problem, the use of edible humectants to maintain the dried fruit in a softer more desirable condition over extended periods of time is well known and widely reported. A number of processes have been disclosed for infusing fruit with humectants by coating dry fruit such as raisins by spraying or immersing the fruit with the desired humectant or humectants as described specifically in the Background of the Invention in U.S. Pat. No. 5,000,971. One of the processes described is an infusion technique utilizes the process of immersing the dried fruit with the humectant in a wasteful manner so that excess humectants are forming pools over the extended period of time needed for the infusion to occur and these pools of humectants are generally not desired for reuse. Another process described is a spraying technique wherein the humectant is sprayed on the dried fruit over extended periods of time with losses of humectant on dripping from the dried fruit during infusion. U.S. Pat. No. 5,000,971 is specifically directed to a process for carefully spraying without forming pools of humectants followed by tumbling the sprayed dried fruit and waiting four weeks for the infusion to occur. A major drawback associated with the immersion of dry fruit with a humectant especially glycerol with raisins is that an equilibrium is established where the glycerol is diluted with the components which come out of the raisins. Sugars, water, flavors and other components are the principle diluents. Removal of some of the raisin flavor is highly undesirable. Some food processors regard the resulting diluted glycerol solution of such composition as being sufficiently changed composition as to be unsuitable for extended immersion or repeated immersion of raisins and the resulting decanted liquid glycerol solution becomes a disposal problem. This is not only a problem from the economic perspective, in view of all the wasted glycerol but is also a problem from the environmental perspective, inasmuch as the waste material has a high biological oxygen demand.

There remains, however, a present need for a process capable of treating dried fruits so that these products retain all of their natural flavor, remain soft, flavorful and of good color for extended periods of time. It is also desirable to provide a process which will be less energy intensive than known infusion techniques where large energy inputs are required.

SUMMARY OF THE INVENTION

The present invention is unique in the technique of infusing edible humectants into dry fruit and especially raisins. The coating of the dried fruit with an edible humectant containing gel in the form of a paste permits the dried fruit to accept the humectant without immersing the fruit into a liquid humectant or without spraying and tumbling the fruit to assure that infusion occurs. In this invention once the gel paste is coated on the fruit, the infusion continues without removing any fruit flavors, without any mechanical means such as tumbling or mixing which could damage the fruit. In a matter of time, the product of this invention permits the osmotic dispersion of an edible humectant with water in the fruit without collapse or damage to the internal cellular structure of the fruit. A highly desirable soft fruit product is obtained by this invention which has a water activity in the range from about 0.2 to about 0.6 and prevents the fruit on storage from becoming unacceptably hard or at least quite tough especially when packaged in the presence of dry products such as dry ready-to-eat cereals. The term "water activity" is well known in the art as the measure of the ratio of the equilibrium vapor pressure of water above a substance such as food, to the vapor pressure of pure water, both taken at the same temperature.

DESCRIPTION OF THE INVENTION

The present invention utilizes a unique and different process for infusing an edible humectant into a dried fruit. This is accomplished by initially preparing an edible gel comprising an edible humectant with water and an edible gel-forming substance. The amounts of a humectant in the gel can range from about 70 to about 92 weight percent, preferably about 75 to about 90 weight percent while the water present can range from about 8 to about 30 weight percent, preferably about 10 to about 25 weight percent. A small amount of a gel forming substance must be present to produce the gel.

The edible humectants which can be used include among others, glycerol, propylene glycol, corn syrup, dextrose, honey, fructose, high fructose corn syrup and mixtures thereof. The humectant is selected to achieve a desired texture as well as achieve a desirable taste.

The term "edible gels" as used herein, is defined as macromolecules having high molecular weights which, when hydrated, form a lattice network or structure holding large quantities of solvent such as water, edible humectants and mixtures thereof. These edible gels can be formed by various ways such as heat setting, adjusting the pH, cooling the mixtures by rapid cooling or slow cooling over periods of time, adding cations including potassium, sodium, calcium and other techniques can be used to form the desired gel. These gel network call consist of polysaccharides or proteins.

The edible gel-forming substances into which the edible humectant and water is incorporated can include alginate, pectin, starch, gelatin, carrageenan and mixtures thereof, among others.

Once the aqueous humectant containing gel is formed and set, it must be treated such as rapidly mixing, shearing and the like, to provide a gel paste which is soft enough to spread evenly on the surface of the dried fruit, the gel must have a viscosity which will permit the gel to adhere to the dried fruit without flowing on free standing and the gel must be stable enough to avoid synersis.

The gel paste can be coated on the dried fruit in any known satisfactory manner such as hand blending the paste with the dried fruit or mechanically mixing the dried fruit with the gel paste. The coating should take place in a manner to avoid physically abusing the dried fruit on mixing. The amount of gel paste coated on the dried fruit is sufficient to infuse about 5 to about 16 weight percent, preferably about 10 to about 15 weight percent of the humectant into the dried fruit over a period of time. The weight ratio of dried fruit to gel paste can range from about 6 to 1 to about 3 to 1, preferably about 5 to 1 to about 4 to 1.

The dried fruit which is used can be any fruit capable of undergoing an infusion with an edible humectant without substantial collapse or damage to the internal cellular structure of the fruit. The dried fruits which can be used in this invention include, among others such as apples, bananas, blackberries, blueberries, cherries, melons, peaches, pears, pineapples, plums and raisins. The dried fruit used should have a moisture content in the range from about 5 to about 50 weight percent, preferably about 10 to about 25 percent. The amount of moisture in the dried fruit is dependent on the type of fruit used.

After the dried fruit has been coated with the aqueous, edible, humectant gel, the coated dried fruit undergoes infusion of the humectant from the gel into the fruit over a period of time until the infusion equilibrium is reached. This is accomplished at temperatures in the range from ambient temperatures to as high as 160° F., preferably at temperatures from about 70° F. to about 130° F. It should be noted that the infusion takes place in a stationary position without mixing, blending and the like. This type of infusion requires a minimum of energy with a minimum or no damage to the infused dry fruit. Furthermore, no flavor is lost from the dried fruit during the infusion in contrast to the immersing of the dry fruit in the liquid humectant where part of the flavor of the fruit is extracted in the immersion infusion process.

The treated dried fruit of this invention closely resembles untreated fresh dried fruit in terms of appearance, taste and texture but the treated fruit exhibits very substantial superiority over the untreated fruit in its ability to remain soft and palatable over extended storage periods. The fruits may be packaged and sold as such or may be incorporated into other foods without adverse effects on softness retention. For example, treated fruit may be packaged with relatively dry ready-to-eat cereals without substantial loss of softness during prolonged storage.

The following examples are presented for the purpose of further illustrating and explaining the present invention and are not to be taken as limiting in any manner. Unless otherwise indicated, all parts and percentages are by weight.

EXAMPLE 1

Glycerin (130 grams, 99.7%, Proctor & Gamble), water (38 grams) and modified starch (7.5 grams, Reditex, Staley) were mixed and heated to 200° F. The soft gel was added to 729.5 g of raisins. The gel was dispersed simultaneously while being mixed with the raisins. Glycerin infusion of the raisins required two days standing at 130° F. No agitation was necessary during this period. The infused raisins were cooled to 80°–50° F. and mixed with dry corn syrup (Cantab, Pennwalt Foods) 95 g. The Aw of this product was 0.50. If preferred, the infusion process can be carried out at 70° F. for one month standing. The resulting infused raisin remained acceptably soft even when added to breakfast cereals with starting Aw of 0.20.

EXAMPLE 2

Sodium alginate (1 gram) and calcium anhydrite (0.20 grams) were dispersed in glycerin (130 grams). Water (38 grams) was added to this mixture. The calcium alginate gel was formed in 90 minutes at room temperature. The gel was shredded with a mixer to form a spreadable paste. This paste was mixed with 700 grams of raisins. The raisin coated with gel paste was allowed to stand at 75° F. for three weeks for complete infusion of glycerin. The raisin was coated with dry corn syrup [Cantab] as in Example 1. The resulting infused raisin had a soft texture which remained acceptably soft even when added to breakfast cereals having a starting Aw as low as 0.20.

EXAMPLE 3

Glycerin (130 grams), water (15 grams), high methoxyl pectin (3 grams), and citric acid (0.40 grams) were mixed and heated to 210° F. The gel formed on cooling the mixture to room temperature. The soft gel was mixed with 740 grams of raisins. The gel was dispersed during the process of mixing. Infusion of glycerin into the raisin was achieved in three weeks at 75° F. The infused raisin was coated as in Example 1. These raisins remained acceptably soft even when mixed with breakfast cereals with a starting Aw as low as 0.20.

EXAMPLE 4

Glycerin (130 grams), water (24 grams), and kappa carrageenan (3 grams) were mixed and heated to 210° F. The gel formed on cooling. This gel was mixed with 740 grams of raisins. The soft gel was dispersed simultaneously as it was being mixed with the raisins, forming a gel paste on the raisins. The gel infusion took three weeks at 75° F. The raisins were coated with dry corn syrup [Cantab] as in Example 1. These raisins remained acceptably soft even when mixed with breakfast cereals having a starting Aw as low as 0.20.

In the above Examples, other dried fruits can be substituted for raisins to achieve the same result.

What is claimed is:

1. A process for infusing an edible humectant into the dried fruit comprising
   (a) preparing an edible gel comprising a uniformly dispersed edible humectant present in amounts ranging from about 70 to about 92% weight percent, water in amounts from about 8 to about 30 weight percent and an edible gel forming substance;
   (b) treating said gel to provide a gel paste soft enough to spread evenly on the surface of said dried fruit, said gel paste having a viscosity which will adhere to said dry fruit and stable enough to avoid synersis;
   (c) coating said gel paste in a substantially even manner on said dried fruit, which has a moisture content from about 5 to about 50 weight percent;
   (d) maintaining said coated dried fruit at temperatures from about ambient temperatures to about 160° F.

for a period of time to provide the infusion of said edible humectant into said dried fruit.

2. The process of claim 1 wherein the edible humectant in the said edible gel present in amounts ranging from about 75 to about 90 weight percent and the water content ranges from about 10 to about 25 weight percent.

3. The process of claim 1 wherein said edible gel-forming substance is selected from the group consisting of alginate, pectin, starch, gelatin, carrageenan and mixtures thereof.

4. The process of claim 1 wherein the moisture content of said dried fruit ranges from about 10 to about 25 weight percent.

5. The process of claim 1 wherein said coated dried fruit is maintained at temperatures ranging from about 70° F. to about 130° F. for a period of time to provide the infusion of said edible humectants.

6. The process of claim 1 wherein the humectants are selected from the group consisting of glycerol, propylene glycol, corn syrup, dextrose, honey, fructose, high fructose corn syrup, and mixtures thereof.

7. The process of claim 1 wherein said dried fruits are selected from the group consisting of apples, bananas, blackberries, blueberries, cherries, melons, peaches, pears, pineapples, plums and raisins.

8. The process of claim 1 wherein the dried fruit is raisins.

9. The process of claim 1 wherein said humectant is glycerol, said gel is calcium alginate and the dried fruit is raisins.

10. The process of claim 1 wherein said humectant is glycerol, said gel is a starch and the dried fruit is raisins.

11. The process of claim 10 wherein said gel is pectin.

12. The process of claim 10 wherein said gel is gelatin.

13. The process of claim 10 wherein said gel is carrageenan.

* * * * *